US006725518B2

(12) United States Patent
Reed

(10) Patent No.: US 6,725,518 B2
(45) Date of Patent: Apr. 27, 2004

(54) CASTING REPAIR METHOD

(76) Inventor: Gary Jack Reed, 1015 S. Soderquist Rd., Turlock, CA (US) 95380

( * ) Notice: Subject to any disclaimer, the term of this patent is extended or adjusted under 35 U.S.C. 154(b) by 0 days.

(21) Appl. No.: 09/818,196

(22) Filed: Mar. 26, 2001

(65) Prior Publication Data

US 2001/0009056 A1 Jul. 26, 2001

Related U.S. Application Data

(62) Division of application No. 08/691,181, filed on Aug. 1, 1996, now Pat. No. 6,212,750, which is a division of application No. 08/381,555, filed on Jan. 31, 1995, now Pat. No. 6,071,051, which is a division of application No. 07/751,291, filed on Aug. 28, 1991, now Pat. No. 5,417,532.

(51) Int. Cl.$^7$ ................................................. B23P 15/00
(52) U.S. Cl. .................................. 29/402.17; 29/402.11
(58) Field of Search ......................... 29/402.11, 402.17, 29/402.09, 402.12, 402.15; 411/5, 386, 399, 426; 403/11

(56) References Cited

U.S. PATENT DOCUMENTS

| | | | |
|---|---|---|---|
| 1,980,093 A | 11/1934 | Rosenberg | |
| 4,662,806 A | 5/1987 | Reed | |
| 4,824,279 A | * 4/1989 | Casazza | 29/402.12 |
| 4,845,828 A | 7/1989 | Reed | |
| 5,417,532 A | 5/1995 | Reed | |
| 6,071,051 A | 6/2000 | Reed | |

* cited by examiner

Primary Examiner—I Cuda Rosenbaum
(74) Attorney, Agent, or Firm—Bernhard Kreten

(57) ABSTRACT

A method and apparatus for repairing a casting in a cold metal repair process includes a plurality of drilling fixtures which facilitate the creation of one or more lock receiving recesses positioned generally transverse to the casting crack. The lock receiving recesses are formed of a single sized circular bore combination having alternating double and single circular portions to maximize strength. A plurality of correspondingly configured metal locks are inserted into the lock receiving recesses to provide transverse metal locks drawing the casting portions on each side of the crack together. A plurality of threaded bores are formed along the remainder of the casting crack in overlapping spacing which receive a corresponding plurality of stitching pins. The stitching pins each define threaded shaft portions having pointed ends and undersized major pitch diameter threads adjacent the pointed ends. A frusto-conical shoulder is formed on the opposite end of the threaded shaft and a break off drive head is coupled to the frustro-conical shoulder by a break off groove structure. When the stitching pins are inserted into their respective threaded bores, the undersized major pitch thread portions facilitate the threading the pin into the threaded bores. The pointed ends of the stitching pins provide complete filling of the threaded bores while the frustro-conical shoulder portions are operative to crush the first few threads of the threaded bores to enhance the seal obtained.

20 Claims, 7 Drawing Sheets

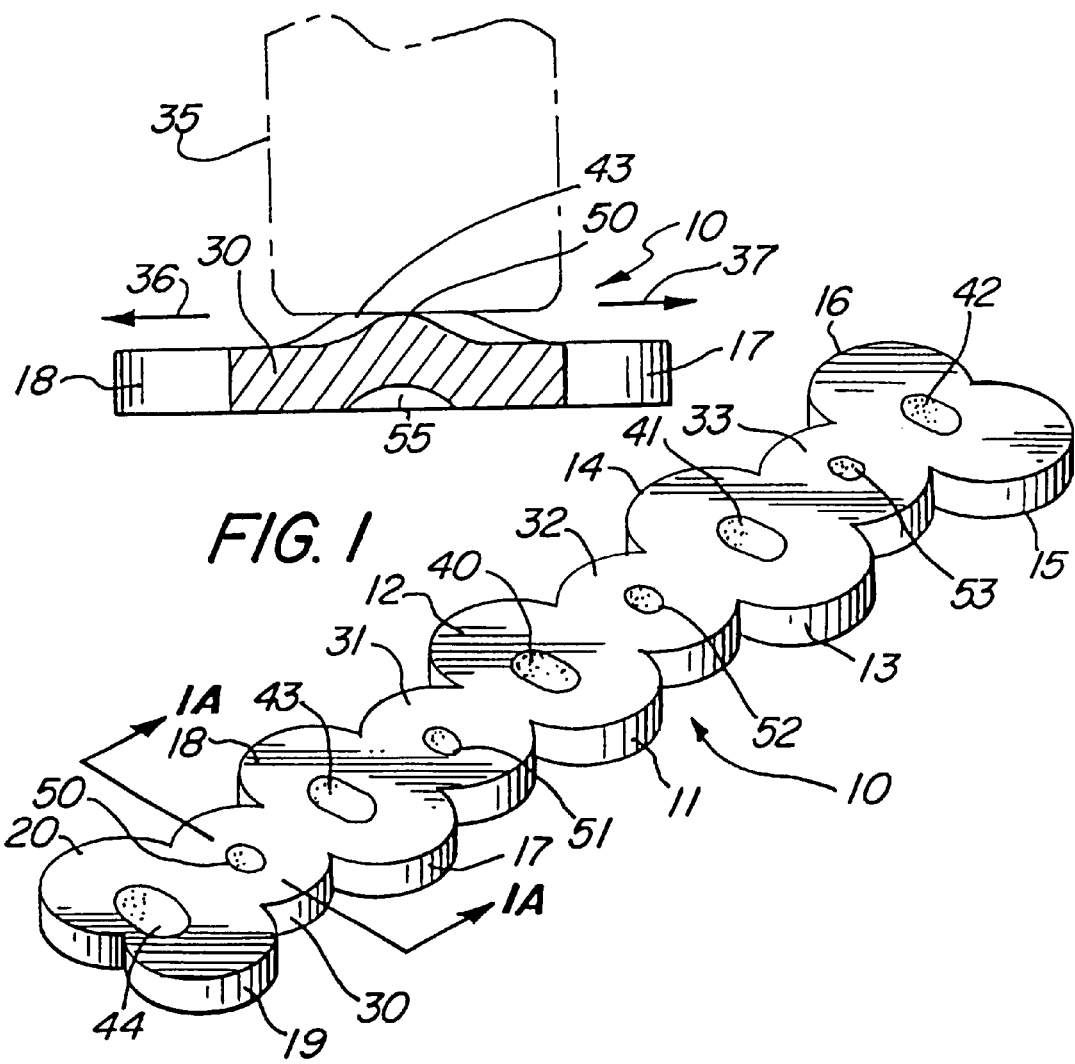

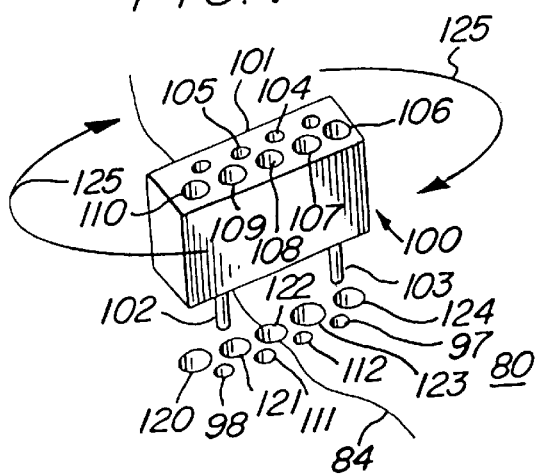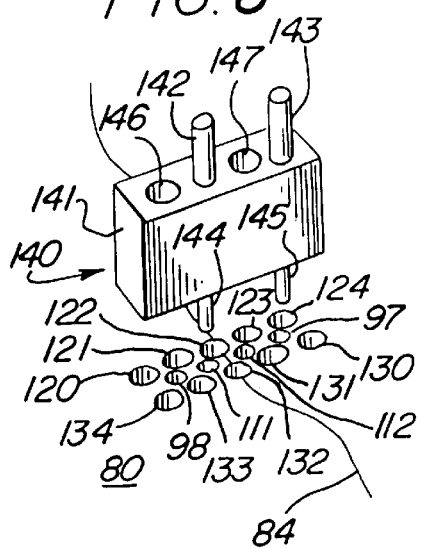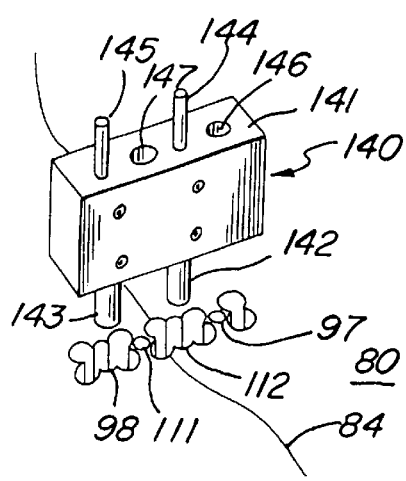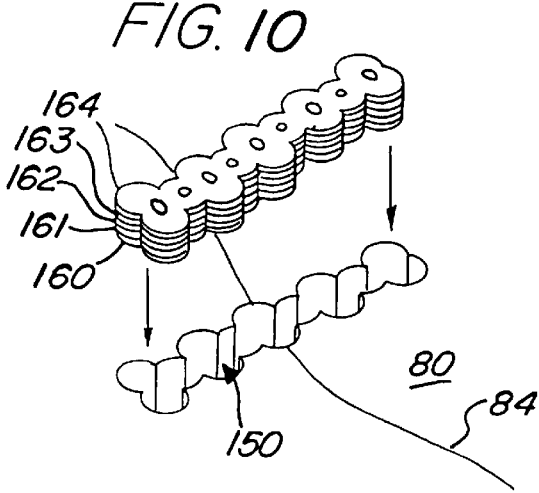

CASTING REPAIR METHOD

CROSS-REFERENCE TO RELATED APPLICATIONS

This application is a division of U.S. patent application Ser. No. 08/691,181, filed Aug. 1, 1996, now U.S. Pat. No. 6,212,750, which is a division of U.S. patent application Ser. No. 08/381,555 filed Jan. 31, 1995 issued Jun. 6, 2000, U.S. Pat. No. 6,071,051, which is a division of U.S. patent application Ser. No. 07/751,291 filed Aug. 28, 1991 issued May 23, 1995, U.S. Pat. No. 5,417,532.

FIELD OF THE INVENTION

This invention relates generally to casting repair and particularly to an apparatus and method for cold metal repair for casting breaks, cracks and other damage.

BACKGROUND OF THE INVENTION

A great number of machines in use today rely upon cast iron parts or "castings" for strength and reliability. Cast iron is frequently selected as the preferred means of fabricating high strength machine components in a virtually endless variety of machine environments. Such cast iron fabrications include engine blocks, pump housings, manifolds, valve bodies and the like. In large industrial or commercial-type machines, the castings used in many applications are correspondingly large and costly. With all of the advantages which cast iron provides to the machine fabricator and designer, iron castings are subject to several limitations. Perhaps the most significant limitation in the attractiveness of cast iron fabrications in many large machine environments arises from the difficulty of repairing such castings in the event they become cracked, broken or otherwise damaged. In small machines, the castings used are correspondingly small and casting repair capability does not present a significant limitation. This is because small machines may usually be disassembled to completely replace a small broken casting. In some environments, even relatively modest sized machines are placed in operational environments or physically constricted areas which make disassembly of the machine for casting replacement impractical. In large machines, the size and cost of castings makes their replacement costly and difficult. In certain environments in which large machines are used, such as underground systems, the replacement of a damaged casting may be virtually impossible.

The difficulties and high costs associated with casting replacement in operating environments such as those described above create a need in the art for apparatus and methods which permit repair rather than replacement of damaged iron castings. However, a significant disadvantage associated with cast iron fabrications is the difficulty of repairing them once they are cracked or otherwise damaged. The metal structure of most cast metals does not tolerate the use of conventional metal repair techniques such as welding or brazing due to the heat associated with such repair processes. In essence, the application of heat which accompanies welding or brazing repairs alters the metal structure of the casting and creates discontinuities of the surrounding metal. These variations and discontinuities weaken the overall casting strength in the region of the repair and are, as a result, undesirable and unsatisfactory. Other systems have been tried utilizing adhesive bonding materials such as epoxys or the like. Such systems may be satisfactory for extremely limited applications but have not enjoyed general success in meeting the needs of casting repair.

In efforts to meet the need for casting repair apparatus and methods which avoid the damaging effects of heat associated with conventional welding or brazing-type processes, practitioners in the art have developed certain "cold metal" repair techniques which do not utilize significant heat in affecting casting repair.

U.S. Pat. No. 4,662,806 issued to Reed sets forth a Metal Lock System and Method for repairing a casting having a crack therein. The metal lock is formed of an elongated rigid member having a plurality of lobes formed from adjacent portions thereof in a generally circular cross-section. A pattern of holes is drilled into the casting, transverse to the crack and one or more elongated metal locks are forced into the transverse drilled pattern to provide a metal locking action intended to prevent the cracked portions from spreading apart. A plurality of threaded holes are then drilled along the crack in an overlapping pattern and a plurality of threaded fasteners or lacing plugs are threaded into the overlapping holes to complete the casting repair. The lacing plugs are provided with a driving head and a break-off groove formed in the fastener. The break-off groove is intended to shear and cause the head portion of the lacing plug to be broken from the threaded remainder once the lacing plug has been threaded into the casting. As a final step, the excess of the lacing plugs extending above the surrounding casting surface may be ground away.

U.S. Pat. No. 4,845,828 issued to Reed sets forth a Method for Repairing a Metal Casting having a Crack or Break Therein which utilizes apparatus of the type set forth in U.S. Pat. No. 4,662,806. The method comprises the drilling of one or more hole patterns transverse to the casting crack which are characterized by alternate large and small diameter holes. One or more correspondingly configured metal locks are embedded into the drilled hole pattern transverse to the casting crack. A plurality of tapered holes are then drilled and tapped along the casting crack in an overlapping arrangement. The drilling process is facilitated by the use of a plurality of drilling fixtures or jigs. A plurality of lacing plugs are threaded into the drilled and tapped apertures. The lacing plugs are configured to include a break away groove which causes the head portion of the lacing plug to shear and separate along the break away groove once the lacing plug is fully seated. After all metal locks and lacing plugs have been installed, the excess plug material may be removed by grinding or other processes.

While the foregoing described prior art apparatus and methods for cold metal repair of damaged castings have enjoyed some success, the environment of casting repair remains extremely demanding and repairs remain difficult. Thus, there remains a continuing need in the art for evermore improved apparatus and methods for casting repair. In particular, there remains a need for repair systems which function to more effectively draw the casting portions on each side of a crack or damaged area together to better prevent spreading of the crack and misalignment of the crack. Prior art locks have not successfully achieved this function and often actually tend to spread the casting portions adjacent the crack when the locks are installed. Furthermore, the prior art stitching pins or lacing plugs have, in many instances, failed to form a liquid-tight/gas-tight fit when installed within their threaded bores. In addition, the entire casting repair strength is, in many respects, limited to the strength of the transversely placed metal locks themselves together with the strength of the metal lock grip upon the casting portions which receive the metal lock. In prior art locks, the design of the metal locks has generally required that the lock strength be compromised to maintain grip tenacity and thus limit the overall strength of the casting repair.

Thus, there remains a continuing need in the art for an improved apparatus and method for casting repair which overcomes these limitations of the prior art systems.

SUMMARY OF THE INVENTION

Accordingly, it is a general object of the present invention to provide an improved apparatus and method for cold metal casting repair. It is a more particular object of the invention to provide an improved apparatus and method for cold metal casting repair which more securely repairs the casting damage and which draws the repaired casting portions together to provide a secure repair and prevent spreading of the crack and realignment of the cracked portion.

In accordance with the present invention, there is provided for use in repairing a cracked casting having a crack formed therein, a casting repair apparatus which comprises: at least one metal lock defining a major axis and defining a center pair of circular lobes spaced apart on each side of the major axis, a plurality of circular lobe pairs equally spaced from the center pair, and a plurality of single circular lobes each centered upon the major axis and interleaved between the circular lobe pairs in an overlapping arrangement, the center pair of circular lobes, the plurality of circular lobe pairs and the single circular lobes all having substantially equal radii of curvature; a plurality of stitching pins; and means for forming at least one metal lock recess having a shape corresponding generally to the metal lock.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a metal lock constructed in accordance with the present invention;

FIG. 1A sets forth a section view of the metal lock of FIG. 1 taken along section lines 1A—1A in FIG. 1;

FIG. 7 sets forth a perspective view of the present invention casting repair method following completion of the hole drilling shown in FIG. 6 and the reversal of the drilling fixture;

FIG. 8 sets forth a perspective view of the present invention casting repair following completion of the drilling steps using the fixture of FIGS. 5, 6 and 7 and showing the alignment of the third drilling fixture of the invention;

FIG. 9 sets forth a perspective view of the use of the drilling fixture of FIG. 8 reversed to complete the redrilling of the center row of apertures;

FIG. 10 sets forth a perspective assembly view of the insertion of a plurality of metal locks into the completed drilled metal lock bores;

DESCRIPTION OF PREFERRED EMBODIMENT

Figure 1B:
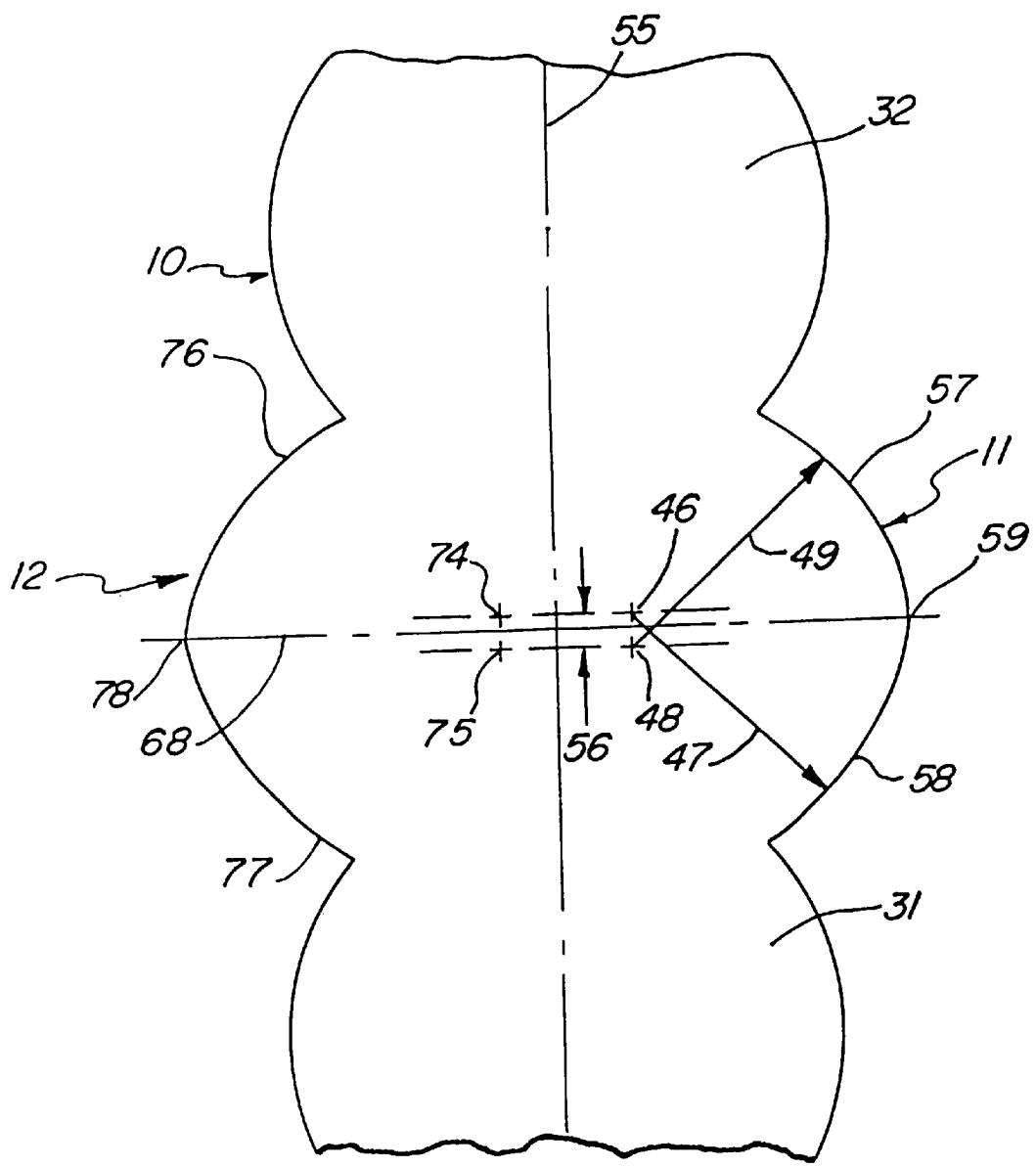
FIG. 1B sets forth a partial view of the metal lock of FIG. 1.

FIG. 1 sets forth a perspective view of a metal lock constructed in accordance with the present invention and generally referenced by numeral 10. Metal lock 10 defines an elongated generally planar member having formed therein a plurality of circular or arced lobes arranged in a predetermined pattern. Specifically, metal lock 10 defines a pair of oppositely facing circular lobes 11 and 12 having a pair of circular portions 31 and 32 formed on either side thereof. Metal lock 10 further defines a pair of circularly shaped oppositely facing lobes 13 and 14 joined to circular portion 32 on one side and to a circular portion 33 on the remaining side. A pair of oppositely facing circular lobes 15 and 16 are joined to circular portion 33 and form the end lobe pair for metal lock 10. Similarly, a pair of circularly shaped oppositely facing lobes 17 and 18 are joined to circular portion 31 and to a circular portion 30. A pair of oppositely facing circular lobes 19 and 20 are joined to circular portion 30 and form an end lobe pair for metal lock 10. In its preferred form, metal lock 10 is formed of a single generally planar high strength metal sheet within which the lobes shown in FIG. 1 are formed.

Metal lock 10 further defines a plurality of upwardly extending raised projections 50 through 53 and 40 through 44. Projections 50 through 53 are generally circular in configuration and are generally centered upon the upper surface of circular portions 30 through 33 respectively. In contrast, projections 40 through 44 are elongated or oval in shape and are generally centered between pairs of oppositely facing circular lobes. Specifically, upwardly facing projection 40 is generally centered between circular lobes 11 and 12. Similarly, projection 41 is generally centered between circular lobes 13 and 14 while projection 42 is generally centered between circular lobes 15 and 16. Finally, projection 43 is generally centered between circular lobes 17 and 18 while projection 44 is generally centered between circular lobes 19 and 20.

In accordance with an important aspect of the present invention, it will be apparent to those skilled in the art from examination of FIG. 1 that circular portions 30 through 33 as well as circular lobes 11 through 20 comprise circular segments having the same size radius. Thus, in essence, the configuration of metal lock 10 is formed by oppositely facing circular lobe pairs and interleaved or connecting single circular segments. In accordance with an important advantage of the present invention, the use of circular lobes and circular portions having a common radius of curvature permits the pattern of drilled bores within the to-be-repaired casting to be formed using a single sized finish drill. In addition, the configuration of metal lock 10 having alternating lobe pairs provides a maximum strength for metal lock 10 together with a secure and tenacious grip thereby upon the casting material in the manner described below.

In its preferred form, metal lock 10 is fabricated with a subtle variation of the shape of circular lobes 11 and 12 at the center of the metal lock. Thus, with temporary reference to FIG. 1B, this preferred form of circular lobes 11 and 12 may be shown in greater detail.

FIG. 1B sets forth an enlarged view of the center portion of metal lock 10. For purposes of clarity, projections 40, 51 and 52 are omitted from FIG. 1B. As described above, circular lobes 31 and 32 (as well as the remaining lobes) are symmetrical about center transverse axis 68 which bisects lobes 11 and 12 and which is perpendicular to major axis 55.

To provide a closing force when metal lock 10 (and other similar locks) are inserted into a recess (seen in FIG. 10), lobes 11 and 12 are actually not true circular lobes but rather are formed by offset radii. Specifically, lobe 11 is formed by radii 47 and 49 which are equal to the radii of the remaining lobes but are symmetrically spaced on opposite sides of center transverse axis 68 at centers 46 and 48 respectively. Thus, arcuate portions 57 and 58 which form lobe 11 form a slight point or discontinuity 59 at their junction. Similarly, lobe 12 is formed of arcuate portions 76 and 77 having a slight point 78 at their junction.

The importance of this structure will be better understood following the description of the receiving recess for metal lock 10 described below. However, suffice it to note here that metal lock 10 is "shorter" than the recess which receives it by a distance referenced by numeral 56. As a result, metal lock 10 is stretched slightly by the longer hole pattern of the recess and produces a drawing force tending to maintain the casting crack in tight closure, but most significantly, to prevent any spreading of the crack. The function of projections 30 through 33 and 40 through 44 is set forth below in greater detail. However, suffice it to note here that these projections provide an expansion mechanism which permits the dimensions of the circular lobes of metal lock 10 to be expanded within the casting recess by simply striking each of the projections with a suitable shaped punch (in the manner shown in FIG. 1A).

It will be apparent to those skilled in the art that the present invention metal lock may be fabricated in different sizes and having different lengths while maintaining the proportionate shapes set forth in FIG. 1. It will be equally apparent to those skilled in the art that metal lock 10 may, in certain applications, be fabricated without raised projections 50 through 53 and 40 through 44 without departing from the spirit and scope of the present invention. In addition, it will also be apparent to those skilled in the art that metal lock 10 may be fabricated in a variety of material thicknesses to suit particular needs and applications of the present invention casting repair.

FIG. 1A sets forth a section view of metal lock 10 taken along section lines 1A—1A in FIG. 1. Thus, as set forth above, metal lock 10 includes a plurality of circular portions such as circular portion 30 together with a plurality of interleaved oppositely facing pairs of circular lobes such as circular lobes 17 and 18. Circular portion 30 defines an upwardly extending projection 50 which, in its preferred form, is formed by stamping corresponding recess 55 in the underside of circular portion 30. Similarly, and with temporary reference to FIG. 1, circular lobes 17 and 18 define a generally centered raised projection 43. While not visible in FIG. 1A, it should be apparent that projection 43, in its preferred form, is formed within metal lock 10 by stamping a corresponding recess into the underlying portion of metal lock 10.

In accordance with an important aspect of the present invention, metal lock 10 is expanded when placed within its precision drilled recess within the casting by applying a suitably shaped punch 35 as shown in dashed line representation in FIG. 1A. With punch 35 positioned as shown, an impact force applied to punch 35 tends to depress the underlying projection such as projection 50 of metal lock 10 and flatten both projection 50 and the underlying recess 55. The resulting displacement of material caused by the flattening of projection 50 and recess 55 expands circular portion 30 outwardly in the direction indicated by arrows 36 and 37 causing a tighter fit between metal lock 10 and casting recess thereby enhancing the gripping action, seal and strength of bond for metal lock 10.

Figure 2:
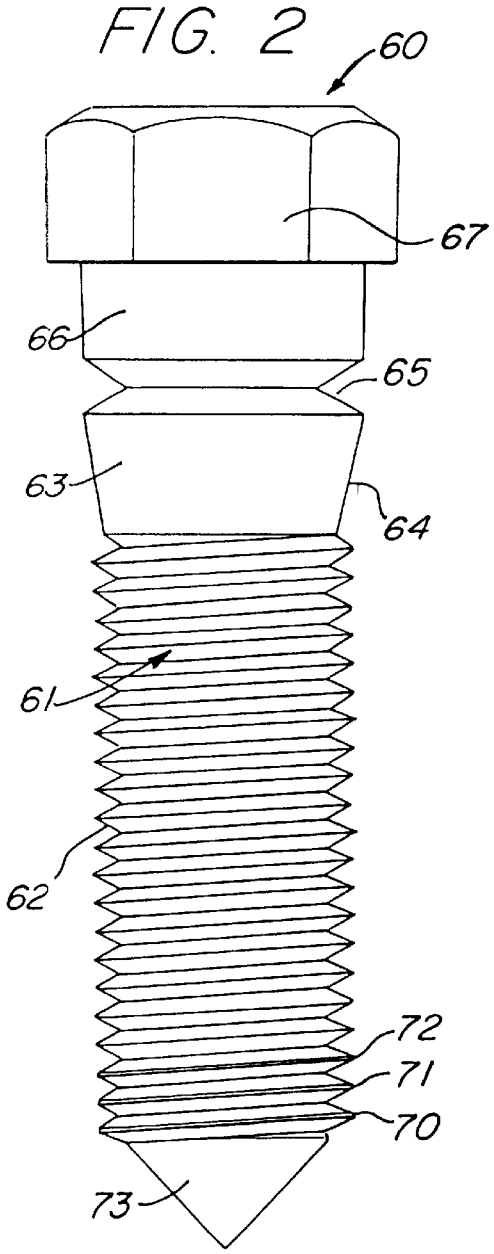
FIG. 2 sets forth a side view of a stitching pin constructed in accordance with the present invention.

FIG. 2 sets forth a stitching pin constructed in accordance with the present invention and generally referenced by numeral 60. Stitching pin 60 defines an elongated threaded shaft 61 supporting a plurality of external threads 62. Shaft 61 terminates at its lower end in a generally cone-shaped pointed end 73. In its preferred form, pointed end 73 has a conical contour which corresponds to the conical angle of the drill used in the casting repair method set forth below. In accordance with an important aspect of the present invention, several threads proximate to pointed end 73 and referenced by numerals 70, 71 and 72 define undersized major diameters which facilitates the starting of threads 62 within the threaded bores set forth below. Stitching pin 60 further includes a shoulder 63 extending upwardly from the topmost of threads 62 of threaded shaft 61. In further accordance with an important aspect of the present invention, shoulder 63 is frustro-conical defining a tapered surface 64. It should be noted that surface 64 of shoulder 63 has a greatest diameter upper portion which extends beyond the greatest diameter of threads 62 and meets threads 62 of threaded shaft 61 at a least diameter lower portion with a diameter equal to the external thread midpoint between the major diameter and minor diameter. A shank portion 66 having a generally cylindrical shape is joined to shoulder 63 at a reduced diameter break-off groove 65. The latter is utilized to provide the shearing of shank 66 from shoulder 63 and separation therebetween during casting repair described below. Stitching pin 60 further includes a hexagonal head 67 joined to shank 66. Head 67 may be shaped in a variety of suitable shapes to accommodate various driving tools. In the embodiment shown in FIG. 2, head 67 defines a hexagonal shape corresponding to conventional hex head socket driving tools.

It should be noted that stitching pin 60 avoids the use of a tapered shank and this provides full threads over most of its length. The use of undersized major diameters on the first several threads 70, 71 and 72 facilitates thread starting without the prior art tapered structure and its resulting loss of thread and thread bit strength.

As set forth below in greater detail, a plurality of stitching pins corresponding to stitching pin 60 are utilized in the present invention casting repair. Stitching pin 60 provides substantial improvement over the stitching pins of the prior art in its provision of pointed end 73 which cooperates with the drilled receiving bore within the casting to more completely fill the bottom portion of the receiving bore. Undersized threads 70 through 72 facilitate the initial threading of stitching pin 60 into the threaded receiving bore. In further accordance with an important aspect of the present invention, threads 62 are preferably formed slightly larger than the corresponding threads in the tapped threaded bore to provide a tight interference fit and effective seal between stitching pin 60 and the casting being repaired. In accordance with a still further important aspect of the present invention, tapered surface 64 of shoulder 63 is forced against and driven into the topmost threads of the threaded bore within the casting when stitching pin 60 is installed.

Figure 2A:
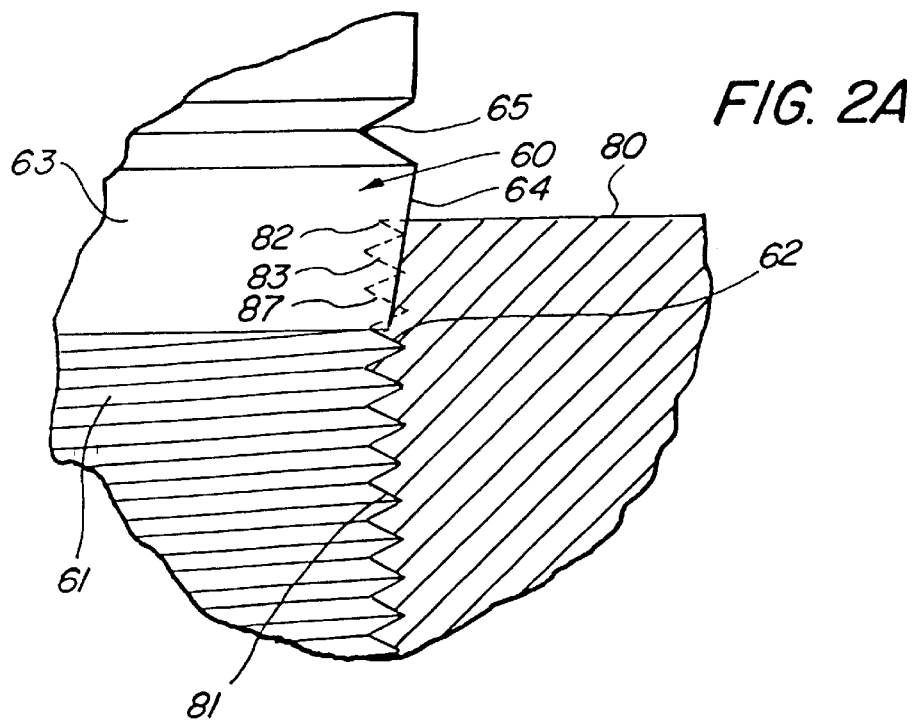
FIG. 2A sets forth a partial section view of the present invention stitching pin seated within a stitching bore.

FIG. 2A sets forth a partial section view showing the crushing action of shoulder 63 of stitching pin 60 as the latter is installed within a typical threaded bore. Thus, a portion of a casting 80 defines a threaded bore 81 having internal threads 82 and 83 (shown in dashed line representation) adjacent the upper surface of casting 80. A stitching pin 60, constructed in accordance with the present invention and shown in FIG. 2, is threaded into threaded bore 81 of casting 80 such that threaded shaft 61 is received within threaded bore 81. As can be seen in FIG. 2A, the outward taper of surface 64 of shoulder 63 is forced against upper threads 82 and 83 of casting 80 with sufficient force to crush threads 82 and 83 against shoulder 63 thereby displacing the metal within threads 82 and 83 and forming an extremely tight secure seal between surface 64 of shoulder 63 and casting 80. It should also be recalled that threads 62 of threaded shaft 61 are slightly oversized beyond the size of threaded bore 81. This oversizing of threads 62 further enhances the seal produced between stitching pin 60 and casting 80. In other words, the shaft's external thread 62 has a constant major diameter which is greater than a major diameter of the thread contained in bore 81 to provide the interference fit.

Figure 3:
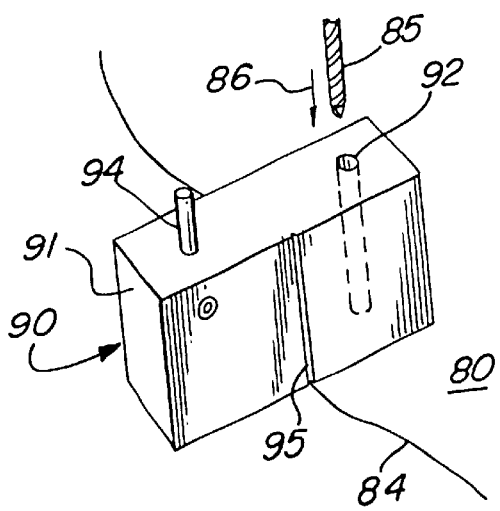
FIG. 3 sets forth a perspective view of the initial drilling operation of the present invention casting repair method.

FIG. 3 sets forth the initial step in the present invention casting repair method. A drill fixture 90 having a generally rectangular body 91 preferably formed of a machine steel or similar material defines a center guide 95, a pin bore 93 (FIG. 4) and a guide bore 92. Pin bore 93 (FIG. 4) and guide bore 92 are equally spaced on either side of center guide 95 and have generally equal diameters. A cylindrical locating pin 94 is precisely fitted within pin bore 93 and extends from body 91 of drill fixture 90. In the position shown in FIG. 3, drill fixture 90 is positioned upon a casting 80 having a to-be-repaired crack 84 defined therein. Drill fixture 90 is positioned such that center guide 95 generally coincides with crack 84. With drill fixture 90 thus positioned, a conventional drill 85 is lowered in the direction of arrow 86 and guided by guide bore 92 to drill a pilot having a predetermined depth into casting 80.

Figure 4:
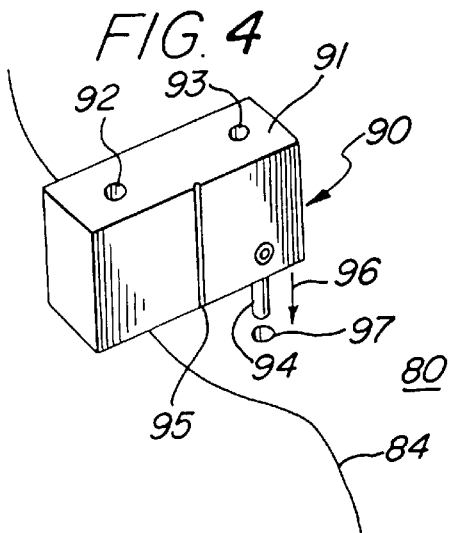
FIG. 4 sets forth a perspective view of the next drilling step in the present invention method.

FIG. 4 sets forth the repositioning of drill fixture 90 following the successful drill of the initial pilot bore in FIG. 3. Thus, FIG. 4 shows drill fixture 90 having a rectangular body 91 defining a guide bore 92 and a downwardly extending locating pin 94. In the position of FIG. 4, drill fixture 90 has been reversed from its position in FIG. 3 causing locating pin 94 to extend downwardly. With drill fixture 90 so oriented, it is lowered toward casting 80 to position locating pin 94 within pilot bore 97. Once drill fixture 90 is so positioned, a second drilling operation is carried forward in which drill 85 (seen in FIG. 3) is guided again through guide bore 92 to drill a second pilot bore 98 (seen in FIG. 5) on the opposite side of crack 84 of casting 80.

Figure 5:
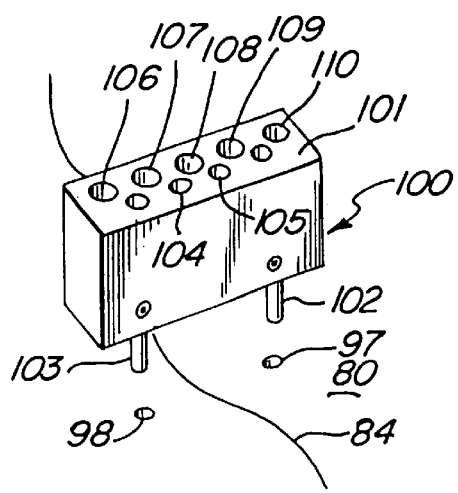
FIG. 5 sets forth a perspective view showing the location of the second drilling fixture prior to its locating insertion into the holes provided in steps 2 and 3.

FIG. 5 sets forth a perspective view showing the position of the next drill fixture generally referenced by numeral 100. As mentioned and shown in FIG. 3 and 4, at this point in the present invention method, a pair of pilot bores 97 and 98 have been drilled into casting 80 on either side of crack 84. Correspondingly, drill fixture 100 includes a rectangular body 101 preferably formed of a machine steel material within which a pair of locating pins 102 and 103 are supported in downward extension. The spacing between locating pins 102 and 103 corresponds precisely to the spacing provided between pilot bores 97 and 98 due to the precise relationship between drill fixtures 100 and 90. Body 101 further defines a pair of equally spaced guide bores 104 and 105 between locating pins 102 and 103. In addition, body 101 defines a plurality of larger diameter guide bores 106 through 110 equally spaced in an interleaved arrangement with locating pins 102 and 103 and guide bores 104 and 105.

Thus, in the position shown in FIG. 5, the next step of the present invention casting repair method is carried forward by lowering drill fixture 100 downwardly to insert locating pins 102 and 103 within pilot bores 97 and 98 and thus position drill fixture 100 upon the surface of casting 80. Thereafter, a pair of pilot bores 111 and 112 are drilled through guide bores 104 and 105 respectively to produce the configuration shown in FIG. 6.

Figure 6:
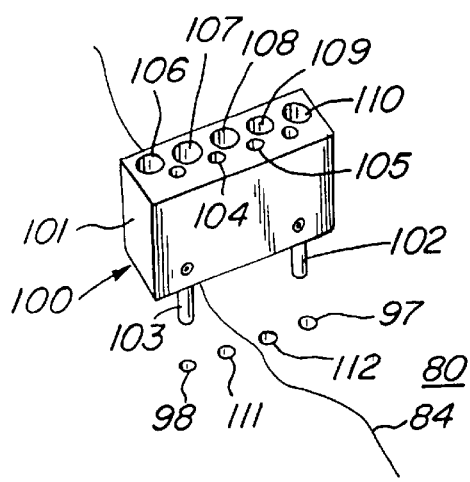
FIG. 6 sets forth a perspective view of the casting repair method following the completion of the drilling of the center row of apertures.

FIG. 6 shows the position of drill fixture 100 following the drilling of pilot bores 111 and 112. Thereafter, with fixture 100 placed upon casting 80 such that locating pins 102 and 103 are received within pilot 97 and 98 respectively, a further drilling operation is carried forward in which larger diameter drills corresponding to the diameters of guide bores 106 through 110 are used to produce a corresponding plurality of equally spaced precisely arranged bores 120 through 124 (seen in FIG. 7).

FIG. 7 sets forth a perspective view of the next step in the present invention method of casting repair. Drill fixture 100 is shown raised from casting 80 following the above-mentioned drilling of bores 120 through 124 in precise relationship to pilot bores 97, 98, 111 and 112. In accordance with an important aspect of the present invention, FIG. 7 shows drill fixture 100 rotated in the direction indicated by arrows 125 through one hundred and eighty degrees rotation to position guide bores 106 through 110 on the opposite side of pilot bores 97, 98, 111, 112. Thus, as drill fixture 100 is again lowered to casting 80 in the rotated position shown in FIG. 7, locating pins 102 and 103 are received in pilot bores 98 and 97 respectively. When so positioned, guide bores 106 through 110 are placed symmetrically opposite bores 120 through 124 formed within casting 80 in the previous drilling operation. Thereafter, another drill step takes place in which bores 130 through 134 are drilled into casting 80 using guide bores 106 through 110 respectively in drill fixture 100. The resulting pattern of bores 130 through 134 is better seen in FIG. 8.

In FIG. 8, the process has reached the point where two precisely positioned rows of full-sized bores 120 through 124 and 130 through 134 are properly formed within casting 80. Also, a plurality of smaller diameter pilot bores 97, 98, 111 and 112 are precisely positioned between the rows of larger diameter bores. At this point, the remaining step in the present invention process for properly forming the precision recess within casting 80 which corresponds to metal lock 10 (seen in FIG. 1) requires merely that pilot bores 97, 98, 111, and 112 be enlarged to the full-size diameter of bores 120 through 124 and 130 through 134. Accordingly, an additional drill fixture 140 is now used in place of drill fixture 100. Drill fixture 140 includes a generally rectangular body 141 preferably formed of a tool steel or similar material. Drill fixture 140 includes a pair of equally spaced large diameter locating pins 142 and 143 extending upwardly from one side of body 141 and a pair of reduced diameter locating pins 144 and 145 extending downwardly from the opposite side of body 141. In accordance with an important requirement for precision drilling of the remaining bores, locating pins 144 and 145 are coaxial with and precisely aligned with locating pins 142 and 143. In addition, the spacing between locating pins 144 and 145 is precisely equal to twice the spacing between adjacent pairs of pilot bores 98 and 111, 97 and 112. Body 141 of drill fixture 140 further defines a pair of large diameter guide bores 146 and 147. The spacing between guide bores 146 and 147 corresponds precisely to the spacing between adjacent pairs of pilot bores 98 and 111, 97 and 112.

Thus, with drill fixture 140 positioned in the manner shown in FIG. 8, fixture 140 is lowered to casting 80 such that locating pins 144 and 145 are received within pilot bores 111 and 97 respectively. When so positioned, the next drilling operation is carried forward and pilot bores 98 and 112 are enlarged to the size of guide bores 146 and 147 which corresponds to bores 120 through 124 and 130 through 134. Thereafter, pilot bores 111 and 112 may now be enlarged in the next drilling operation shown in FIG. 9.

FIG. 9 sets forth drill fixture 140 in preparation for enlarging pilot bores 97 and 111. Following the drill operation in which bores 98 and 112 have been enlarged to provide the bore pattern shown in FIG. 9, drill fixture 140 is rotated one hundred and eighty degrees and inverted with respect to the position shown in FIG. 8. Thus, as is seen in FIG. 9, drill fixture 100 is positioned such that small diameter locating pins 144 and 145 extend upwardly. In addition, the enlargement of pilot bores 98 and 112 carried forward in the previous drill operation permits the precision insertion of locating pins 142 and 143 into the now enlarged 112 and 98 respectively. With drill fixture 140 positioned upon casting 80 such that locating pins 142 and 143 are received within enlarged bores 112 and 98, larger diameter guide bores 146 and 147 are precisely aligned with pilot bores 97 and 111. Thus, the next drilling step may be carried forward using guide bores 146 and 147 to enlarge pilot bores 97 and 111.

Once pilot bores 97 and 111 have been enlarged, the lock receiving recess of the present invention is completely formed and is shown in FIG. 10 and is generally referenced by numeral 150. It will be apparent to those skilled in the art that the depth to which lock receiving recess 150 is bored is, to some extent, a matter of design choice to optimize repairs in different castings configurations. However, it has been found advantageous in most casting repair situations to bore lock receiving recess 150 to a depth approximately equal to eighty percent of the casting thickness.

FIG. 10 sets forth a perspective view of a completed lock receiving recess properly positioned on each side and traversing a casting crack 84. Also shown in FIG. 10 are a plurality of metal locks 160 through 164 shown above and in alignment with lock receiving recess 150. In accordance with an important aspect of the present invention, a plurality of relatively thin metal locks configured in accordance with the structure set forth in FIG. 1 for metal lock 10 are inserted into lock receiving recess 150. This represents a substantial improvement over the prior art structures which attempted to use relatively thick rigid metal locks. Thus, in accordance with the present invention, metal locks 160 through 164 are inserted into lock receiving recess 150. It should be noted that while in certain specialized repair situations it may be desirable to insert metal locks 160 through 164 into recess 150 in a single step, it has been found advantageous in most repair situations to insert each metal lock individually into recess 150. This individual lock insertion permits each lock to be expanded in place by depressing the raised expansion projections on each metal lock using a hammer and punch in the manner set forth above in FIGS. 1 and 1A. Thus, in accordance with the invention, metal locks 160 through 164 are individually inserted into lock receiving recess 150 and secured therein by flattening their respective expansion projections until lock receiving recess 150 is completely filled and metal locks 160 through 164 are tightly situated within recess 150.

It should be noted that recess 150 is formed without the above-described "shortening" of the center portion by which lobes 11 and 12 of metal lock 10 are formed. Thus, the lobe spacing of the receiving portions of recess 150 is "longer" than the lobe spacing of the metal locks. As a result, the forced insertion of locks 160 through 164 into recess 150 stretches the metal locks and establishes a drawing force which is exerted upon the casting to maintain closure of the casting crack and the alignment of casting portions.

Figure 11:
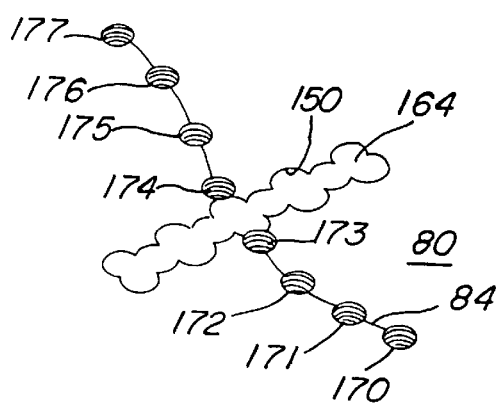
FIG. 11 sets forth a perspective view of the present invention casting repair method following insertion of the metal locks shown in FIG. 10 and the drilling of the initial threaded bores for the stitching pins.

FIG. 11 sets forth the next step in the completion of the present invention casting repair method. This step provides for the drilling and tapping of a plurality of stitching pin bores 170 through 177 in a generally equally spaced arrangement centered along casting crack 84. It will be apparent to those skilled in the art that while FIG. 11 sets forth a single lock receiving recess 150 within which a plurality of metal locks 160 through 164 (seen in FIG. 10) are received, in most casting repair operations a plurality of lock receiving recesses such as recess 150 are spaced as needed along the length of crack 84 and a corresponding plurality of metal locks are inserted therein. However, it is believed sufficient for purposes of illustration in FIGS. 11 through 14 to set forth the present invention method of casting repair using a single metal lock receiving recess and plurality of stitching pins with the understanding that the pattern set forth therein is simply repeated for casting cracks of greater length than crack 84 shown in FIGS. 11 through 14.

Figure 12:
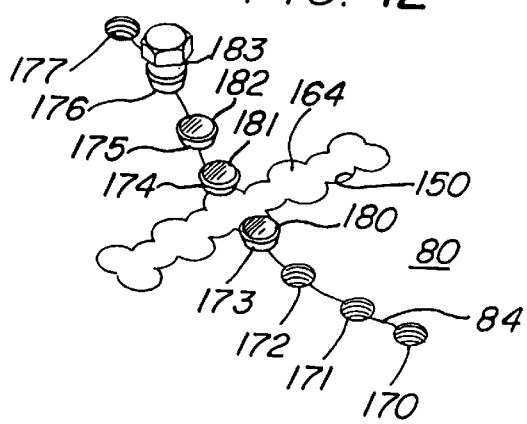
FIG. 12 sets forth a perspective view of the present invention casting repair method showing the insertion of stitching pins.
Figure 14:
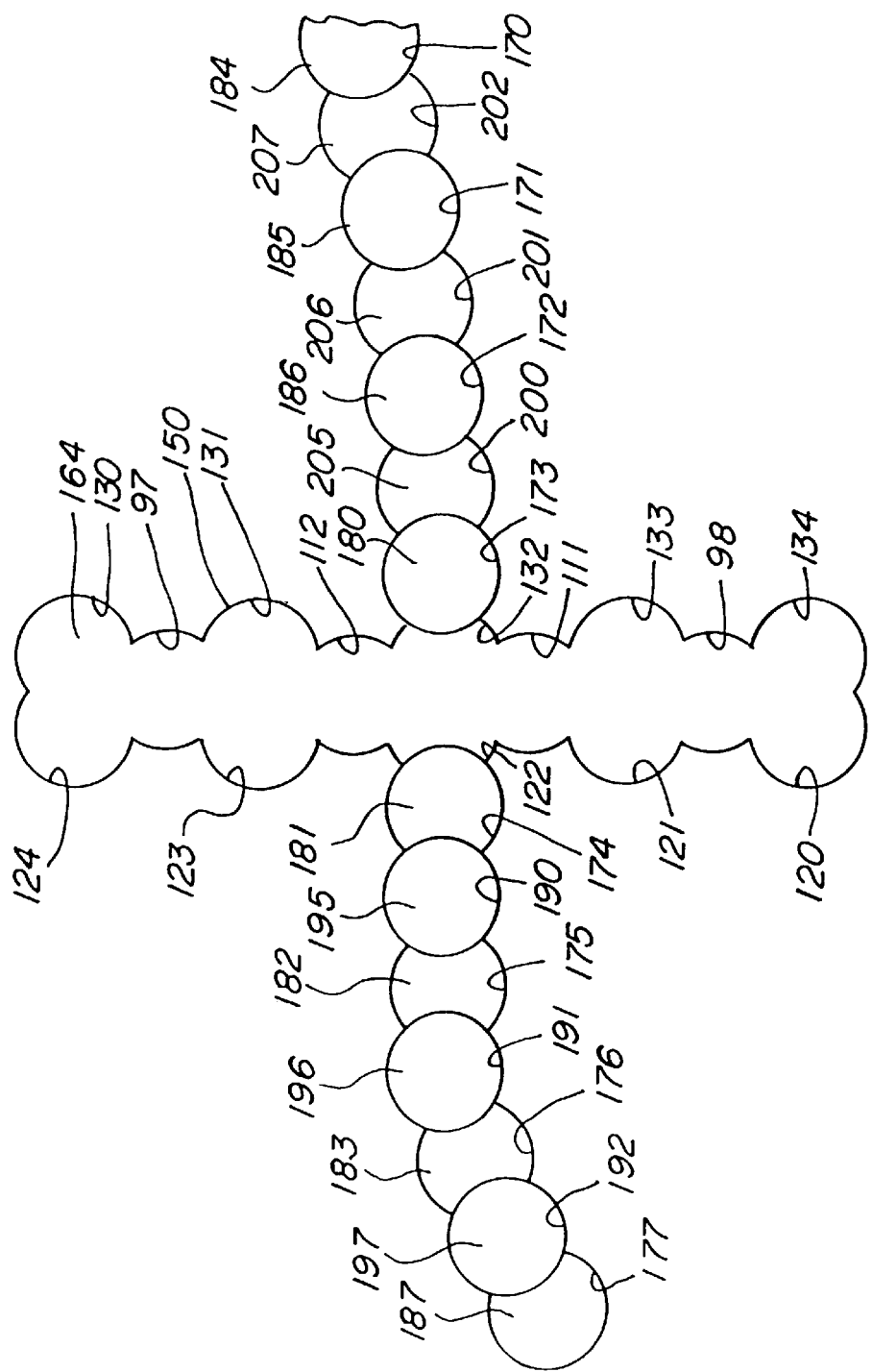
FIG. 14 sets forth a top view of a completed casting repair.

FIG. 12 sets forth the initial steps in completing the present invention casting repair method in which a plurality of stitching pins 180, 181, 182 and 183 are threaded into stitching pin bores 173, 174, 175 and 176 respectively. It should be understood that, in accordance with the present invention, all stitching pins used in the present invention casting repair correspond in structure to stitching pin 60 shown in FIG. 2. Thus, as each stitching pin is threaded into its threaded bore, its frustro-conical shoulder crushes the outermost threads of the receiving bore to produce a tight seal. At the stage of casting repair shown in FIG. 12, stitching pins 180, 181 and 182 have been threaded completely into receiving bores 173, 174 and 175 and the head portions thereof have been separated and removed through the above-described pin shearing which occurs as each head portion separates along the break off groove such as groove 65 of stitching pin 60 (shown in FIG. 2). For purposes of illustration, stitching pin 183 is shown prior to the shearing of its head portion. Thereafter, the insertion of stitching pins into the remaining threaded bores 170, 171 and 177 is carried forward and in each insertion the head portion is removed from the stitching pin leaving each stitching pin firmly embedded within its respective threaded bore such that a portion of each stitching pin extends above the surface of casting 80. It should be noted that in accordance with the preferred application of the present invention casting repair method, threaded bores 173 and 174 on either side of recess 150 overlap the adjacent circular lobes of recess 150 and the metal locks supported therein to provide a reliable seal on either side of recess 150 and to further secure the metal locks inserted therein in a reliable seal.

Figure 13:
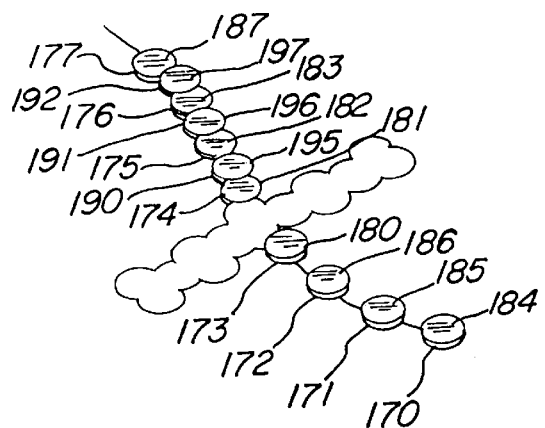
FIG. 13 sets forth a perspective view of the present invention casting repair showing the insertion of the interleaved or overlapping stitching pins.

FIG. 13 sets forth the next step of the present invention casting repair method following the above-described insertion of stitching pins into threaded bores 170 through 177. This next step of the present invention casting repair method is shown partially completed in FIG. 13 in which an additional plurality of threaded bores are drilled and tapped in overlapping interleaved spacing between the installed stitching pins. At the point of casting repair shown in FIG. 13, intermediate threaded bores 190, 191 and 192 have been drilled and tapped in an interleaved overlapping arrangement with respect to threaded bores 174, 175, 176 and 177 and corresponding stitching pins 181, 182, 183 and 187. A corresponding plurality of stitching pins 195, 196 and 197 have been threaded into and received within intermediate threaded bores 190 through 192 respectively. At the point shown in FIG. 13, stitching pins 195 through 197 have been fully inserted and the heads thereof removed through the above-described break away shearing operation. It remains in FIG. 13 to drill and tap a corresponding plurality of intermediate overlapping threaded apertures between stitching pins 184, 185, 186 and 180 to complete the installation of stitching pins. Once this stitching pin installation is complete, the excess portions of stitching pins is removed using a conventional material removal process such as grinding or the like to produce the complete repair shown in FIG. 14. To facilitate the full understanding of the completed repair shown in FIG. 14, the individual reference numbers corresponding to each of the circular bores drilled during the process in which recess 150 was formed have been retained in FIG. 14. It should be recalled that each of the circular portions of lock receiving recess 150 is formed using the same diameter drill. It should also be noted that in accordance with the present invention casting repair, the plurality of stitching pins shown in FIG. 14 completely covers crack 84 in casting 80. In addition, the overlapping arrangement of stitching pins provides for a complete and reliable seal between adjacent stitching pins in which the above-described operation of the novel structure of stitching pin 60 (seen in FIG. 2) is utilized to its utmost advantage.

What has been shown is an improved apparatus and method for carrying forward a cold metal repair of a casting crack which utilizes an improved stronger and more reliable metal lock together with an improved better sealing stitching pin structure. In addition, the metal lock structure used in the present invention apparatus provides a maximum of strength while maintaining a secure and tenacious gripping action upon the casting. The present invention metal lock also provides a drawing force which is operative upon the casting to draw the casting material on either side of the crack together to improve the repair seal thus provided.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. A method for repairing a crack in a cast material, including the steps of:

forming a stitching pin bore of cylindrical configuration in the material extending between sides of the crack, forming internal threads of uniform diameter on sides of the stitching pin bore, providing a stitching pin having a head at one end, a tip at an opposite end, and with external threads on a cylindrical shaft having constant and uniform cross-section between the tip and the head thereby defining a cylindrical shape, the external threads having a constant major diameter along the shaft length greater than a major diameter of the internal threads of the stitching pin bore to provide an interference fit therebetween as the stitching pin advances into the bore so as to provide sealing therebetween along the pin shaft, and threading the stitching pin into the stitching pin bore to provide the interference fit.

2. The method of claim 1 including the further step of reducing a major diameter of at least one of the threads and only adjacent the tip to a major diameter less than a diameter of the internal threads for easy threading initially.

3. The method of claim 2 including the further step of forming a shoulder on the stitching pin between the external threads and the head, the shoulder having a portion thereof with a diameter greater than a major diameter of the external threads.

4. The method of claim 3 wherein said forming a shoulder step includes the further steps of providing the shoulder with a greatest diameter upper portion and a least diameter lower portion, the greatest diameter upper portion having a diameter greater than the major diameter of the external threads and the least diameter lower portion having a diameter less than the major diameter of the external threads for crushing the internal threads of the stitching pin bore.

5. The method of claim 4 wherein said providing step includes the steps of:

forming the tip to exhibit a conical contour corresponding to a conical contour formed in the stitching pin bore, and forming the stitching pin bore when initially drilling the bore such that a bottom thereof has a bottom portion similar in size and shape to the conical contour of the tip of the stitching pin.

6. A repair system for repairing cracks in a casting, comprising in combination:

a generally cylindrical bore formed in the casting and penetrating a crack, said bore oriented with portions of said bore on both sides of the crack, said bore having sides with internal threads formed thereon, and a stitching pin, said pin having a generally cylindrical shaft and said stitching pin including a head at one end, a tip at an opposite end and external threads between said head and said tip, said external threads having a major diameter greater than a major diameter of said internal threads whereby said stitching pin exhibits an interference fit with said bore due to the differences in said thread diameters.

7. The system of claim 6 wherein a plurality of external threads closest to said head have equal major diameters.

8. The system of claim 7 wherein at least one thread adjacent said tip has a major diameter less than said diameter of said internal threads and all other threads have a major diameter greater than said major diameter of said internal threads.

9. The system of claim 8 wherein said bore extends from a surface of the casting and into said casting, and includes a bottom portion of said bore opposite the surface of the casting defining a blind bore, and wherein said tip of said stitching pin includes a conical contour.

10. The system of claim 9 wherein said conical contour of said tip of said stitching pin is shaped and sized similarly to said bottom portion of said hole.

11. The system of claim 10 wherein said stitching pin includes a shoulder between said external threads and said head, said shoulder having a largest diameter portion larger than a major diameter of said external threads.

12. The system of claim 11 wherein said shoulder includes a least diameter portion below said greatest diameter portion, said least diameter portion having a diameter less than said major diameter of said external threads and greater than a minor diameter of said external threads.

13. The system of claim 12 wherein said shoulder is frusto-conical in contour and exhibits a diameter which changes at a constant slope between said least diameter portion and said greatest diameter portion.

14. The system of claim 13 wherein said stitching pin includes a break-off groove between said shoulder and said head, said break-off groove exhibiting a diameter less than a minor diameter of said external threads, whereby said stitching pin is most susceptible to fracture at said break-off groove when torsional loads are applied about a central axis thereof.

15. The system of claim 14 wherein said least diameter portion of said shoulder is located at a junction between said shoulder and said external threads, said least diameter portion having a diameter half way between said major diameter of said external threads and said minor diameter of said external threads.

16. The method of claim 15 wherein said stitching pin includes a break-off groove between said shoulder and said head, said break-off groove exhibiting a diameter less than a minor diameter of said external threads, whereby said stitching pin is most susceptible to fracture at said break-off groove when torsional loads are applied about a central axis thereof.

17. The method of claim 1 further including the step of interposing a frangible groove between the head and the shoulder of the stitching pin, wherein said frangible groove exhibits a diameter less than the minor diameter of the external threads whereby the stitching pin is most susceptible to fracture at said frangible groove when torsional loads are generally applied about a central axis of the stitching pin.

18. The method of claim 17 further including the step of disposing the stitching pin into the threaded bore and applying a torsional load to the head of the threaded bore, thereby threading the stitching pin into the threaded bore until the stitching pin fractures at the frangible groove.

19. The method of claim 18 further including the step of removing excess portions of the stitching pin wherein the stitching pin is substantially flush with a surface of the material.

20. The method of claim 16 further including the steps of:

forming a lock receiving recess by initially drilling a plurality of pilot bores on both sides of the crack;

locating a drill fixture over the crack;

using the pilot bores for holding the fixture by inserting pins on the fixture into the pilot bores for forming a plurality of substantially equally spaced first bores adjacent one side of the pilot bores and on both sides of the crack and forming bores in generally equally spaced arrangement on both sides of the crack;

using the pilot bores for aligning the formation of a plurality of substantially equally spaced second bores adjacent a second opposite side of the pilot bores and on either side of the crack and forming bores in a generally equally spaced arrangement on both sides of the crack wherein the plurality of the first bores and the second bores form two precisely positioned rows of bores in the material and with respect to the pilot bores; and using a second fixture for oversizing the plurality of pilot bores on both sides of the crack such that the pilot bores are sized to substantially equal the size of the first and second bores, and using the second fixture to clear out excess material by drilling wherein the lock receiving recess is formed at a position on each side and traversing the crack.

* * * * *